June 27, 1950  N. WASSERMAN  2,512,756
PORTABLE GARDEN HOSE REEL
Filed Sept. 7, 1946
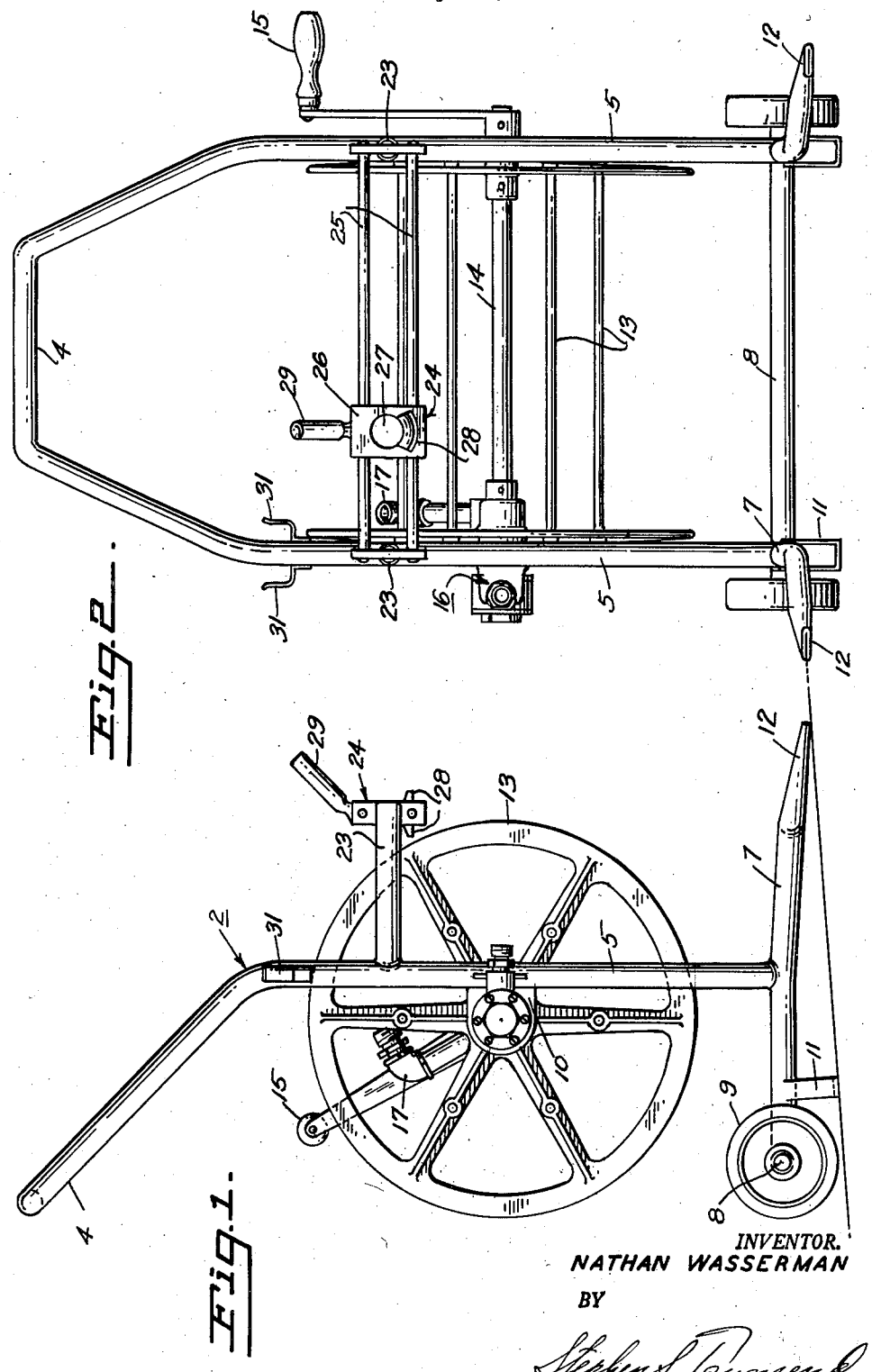
INVENTOR.
NATHAN WASSERMAN
BY
Stephen S. Townsend
ATTORNEY Patented June 27, 1950

2,512,756

UNITED STATES PATENT OFFICE 2,512,756

PORTABLE GARDEN HOSE REEL

Nathan Wasserman, Eureka, Calif.

Application September 7, 1946, Serial No. 695,473

2 Claims. (Cl. 242—87)

This invention relates to hose reels, and, more particularly, to a compact, preferably portable, garden hose reel.

The principal object of the invention is to provide a hose reel, which is simple and sturdy in structure, compact, portable and facile of use. A specific object of the invention is to provide a hose reel provided with means to enable easy and uniform coiling and uncoiling of hose. Further objects are to provide a hose reel which is stable, when in upright position during uncoiling or coiling of hose lengths carried thereon; to provide a hose reel wherein the hose drains during coiling of said hose, thereby preserving the hose against deterioration; and to provide a hose reel upon which hose may be coiled without the user handling the hose length and thereby soiling garments or hands of the user. Another object of the invention is to provide a hose reel which is designed to support a relatively large amount of hose for use in gardens, golf courses, parks and other institutional or private grounds.

Other objects and advantages of the invention will become apparent upon reference to the specification and accompanying drawings in which similar characters of reference represent corresponding parts in the several views.

In the drawings:

Fig. 1 is a side elevational view of the invention.

Fig. 2 is a front elevational view of the invention.

Referring to the drawings and particularly Figs. 1 and 2 which illustrate a preferred form of the invention, the hose reel comprises a U-shaped frame, illustrated generally at 2, comprising a handle portion 4 and vertical standards 5, said standards being affixed to support members 7. The support members 7, disposed substantially normal to the axis of rotation of the reel, as will hereinafter appear, and said standards, are each connected at one end to an axle member 8 which mounts at opposite ends rotatable ground-engaging wheels 9.

Positioned adjacent to each of the whels 9 on the supporting members 7 are depending auxiliary supports 11 which project beyond the outer periphery of the wheels 9 when the hose reel is in vertical, stationary position, as indicated in Fig. 1, and wherein projections 11 and ends 12 of supporting members 7 are in ground engagement whilst the wheels 9 are not in ground engagement. The vertical standards 5 support a reel 13 therebetween mounted on a rotatable axle 14 which is in turn mounted in brackets 10 rigidly affixed to the said vertical standards 5.

A crank 15 is connected to the axle 14 at one end in order that the said reel may be revolved. The axle end opposite handle 15 is provided with a fluid valve connection, generally indicated at 16, in order that liquid may be delivered, under pressure, from a hydrant source (not shown) to hose (not shown) carried upon the reel 13. One end of the hose (not shown) is attached to pipe connection 17. It is noted that while axle 14 may revolve, the hose, or whatever other type of connection is maintained with the hydrant will not become distorted or kink. The fluid connection is conventional in design and forms no part per se of the novelty of the instant invention.

Spaced beyond the outer periphery of reel 13 and supported by the standards 5 through supports 23 rigidly affixed to said standards are two spaced bars 25, disposed parallel to the axis of rotation of said reel, which support slidably a guide member, generally indicated at 24, and comprising a plate 26 having a hose-receiving aperture 27 provided therein. Hose-engaging supports 28 are provided on opposite sides of the plate adjacent to the bottom portion of the aperture 27, over which hose may slide.

A handhold 29, inclined upwardly and outwardly from the rods 25, is attached to the plate 27 in order that the plate may be manually moved along bars 25 between the vertical standards 5. Hooks 31 are provided above the reel on one of the upright standards 5, preferably the standard 5 adjacent to the fluid connection 16, to receive and support the hose or other connection (not shown) adapted to run from fluid connection 16 to the hydrant and the free end of the hose (not shown) carried by the reel 13 when the said reel is being transported from one place to another.

In operation, the fluid connection 16 is connected to a suitable source of water, under pressure, and the free end or working end of the hose (not shown) is threaded through the hole 27. The desired length of hose is uncoiled from reel 13 and after use may be recoiled on reel 13 by use of handle 15 and guide member 24. The guide member 24 allows the operator to wind the reel with one hand by means of handle 15 and guide the coiling of the hose by means of guide member 24 in order to effect a uniform neat coil.

It is noted that when the reel is in a stationary position, i. e. during use of the hose, or coiling or uncoiling thereof, the reel may be tilted to a vertical position so that the ground-engaging wheels are removed from ground contact in order that the structure is in a stable position, as illustrated in Fig. 1, being supported by stationary member 11 and portions 12 of supporting members 7.

It is understood that the invention has been described herein in more or less specific detail for purposes of clarity of illustration and example and that various changes, variations and modifications may be practiced within the spirit of the invention as defined by the appended claims.

I claim:

1. A hose reel comprising a U-shaped frame forming a handle portion, a rotatable hose-carrying reel supported by said frame between the sides of said U-shaped frame, support members mounted on the bottom of said frame and disposed substantially normal to the axis of rotation of said reel and substantially normal to the longitudinal axis of the sides of said U-shaped frame, a ground engaging wheel mounted on one end of each of said support members, and a projection mounted on each of said support members adjacent to a wheel and between said wheel and the free end of said support member opposite said wheel, said projections extending beyond the outer periphery of said wheels, said projections and said support members forming a base for said reel when said frame is tilted in a direction toward said free ends of said support members.

2. A hose reel, according to claim 1, and wherein a manually operable hose guide is supported by said frame between the sides thereof to control the coiling of hose carried on said reel during rotation thereof.

NATHAN WASSERMAN.

REFERENCES CITED

The following references are of record in the file of this patent:

UNITED STATES PATENTS

| Number | Name | Date |
|--------|------|------|
| 344,554 | Weygant | June 29, 1886 |
| 520,815 | Van Horn | June 5, 1894 |
| 843,213 | Juve | Feb. 5, 1907 |